United States Patent [19]

Yiming

[11] Patent Number: 4,862,476
[45] Date of Patent: Aug. 29, 1989

[54] GAS LASER HAVING FLAT DISCHARGER CROSS-SECTION

[75] Inventor: Liug Yiming, Nanjing, China

[73] Assignee: Nanjing Institute of Technology, Nanjing, China

[21] Appl. No.: 201,357

[22] Filed: May 26, 1988

Related U.S. Application Data

[63] Continuation of Ser. No. 843,092, Mar. 24, 1986.

[30] Foreign Application Priority Data

Apr. 1, 1985 [CN] China .................................. 85100563

[51] Int. Cl.[4] ................................................ H01S 3/03
[52] U.S. Cl. ......................................... 372/61; 372/55; 372/87
[58] Field of Search ...................... 372/61, 55, 64, 87, 372/82, 37

[56] References Cited

U.S. PATENT DOCUMENTS

| 3,428,914 | 2/1969 | Bell | 372/61 |
|---|---|---|---|
| 3,815,047 | 6/1974 | Smith et al. | 372/64 |
| 3,904,986 | 9/1975 | Hernqvist | 372/88 |
| 4,054,846 | 10/1977 | Smith et al. | 372/64 |
| 4,352,184 | 9/1982 | Chance | 372/61 |
| 4,455,658 | 6/1984 | Sutter, Jr. | 372/82 |
| 4,464,760 | 8/1984 | Sutter, Jr. | 372/82 |

OTHER PUBLICATIONS

Privalov et al.; "Experimental Investigation of a He-Ne laser With a Discharge Gap of Rrectangular Cross-section", Opt. & Spect., vol. 37, No. 4, pp. 455-457, Oct. 1974.

Primary Examiner—Léon Scott, Jr.
Attorney, Agent, or Firm—Ladas & Parry

[57] ABSTRACT

A laser discharge tube has a substantially-rectangular discharge cross section to achieve a high power of laser output with a shorter discharge tube length.

6 Claims, 1 Drawing Sheet

4,862,476

GAS LASER HAVING FLAT DISCHARGER CROSS-SECTION

This is a continuation of co-pending application Ser. No. 843,092 filed on Mar. 24, 1986.

FIELD OF THE INVENTION

The present invention relates to a gas laser tube for use in a gas laser, such as a He-Ne laser, particularly to a laser tube comprising a discharge tube which has a flat discharge cross section.

BACKGROUND OF THE INVENTION

In a conventional gas laser, such as a He-Ne laser, the gaseous working medium is contained in a capillary having a tube circular cross section, as disclosed for the He-Ne laser of U.S. Pat. No. 4,429,399. In such a laser, the laser gain decreases with increase of the diameter of the discharge region. When the diameter of the discharge region is increased beyond a certain value, for example, about 2.5–5 mm for a He-Ne laser having a 1 m long discharge tube, therefore the power of the laser output will decrease. Thus, for a conventional gas laser, the normal way to increase the power of the laser output is to increase the length of the discharge region, that is, to increase the length of the discharge tube. Therefore, for a gas laser such as a He-Ne laser having high laser output power, a considerable discharge tube length must be employed, which is rather inconvenient both for operation and production.

SUMMARY OF THE INVENTION

An object of the present invention is to provide a gas laser tube, by which high laser output power can be obtained with a much shorter discharge tube.

Another object of the present invention is to provide a He-Ne laser tube which comprises a straight discharge tube having a substantially rectangular discharge cross section.

A further object of the present invention is to provide a novel laser resonator which comprises at least one cylindrical mirror, and which is particularly suitable for use in a laser tube according to the present invention which has a rectangular discharge cross section.

We have found that, for the same tube length, a laser using the laser tube of substantially rectangular) discharge cross section can achieve much higher laser output power than one using a conventional laser tube of a circular discharge cross-section. In a conventional laser, which has a circular discharge cross section, the laser gain decreases with increase of the discharge inner diameter, i.e. the discharge tube diameter. For the laser tube according to the present invention, however, the laser gain of the laser tube can be maintained by increasing the width to height (i.e., length) ratio of its discharge cross section, so that increased laser-output power can be obtained by increasing the width of the discharge cross section of the laser tube without any increase of the length of the laser tube.

The height and width of the cross section of the discharge tube according to the invention may be maintained constant along the longitudinal direction of the discharge tube. In an embodiment of the invention, however, the height or width of said cross section is varied along the longitudinal direction of the discharge tube so as to obtain an activation volume which is substantially the same as the mode volume determined by the optical resonator used with the discharge tube, thus obtaining a further increase in the power of the laser output.

The optical resonator used for the laser tube of the present invention can be a conventional one. However, a better result can be obtained through the use of a resonator comprising a cylindrical reflecting mirror.

Thus, the present invention also provides a laser discharge tube having a substantially-rectangular discharge cross section and an optical resonator having a cylindrical reflecting mirror. The substantially-rectangular discharge cross section of the laser tube of the present invention results in low manufacturing cost and convenient for production, especially for mass production.

The present invention will be better understood from the detailed description given hereinbelow with reference to the accompanying drawings.

DETAILED DESCRIPTION OF THE INVENTION

Figure 1:
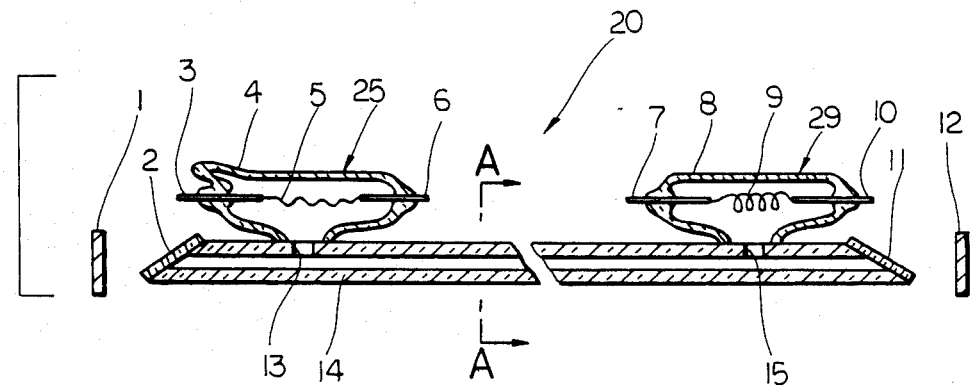
FIG. 1 is a sectional view of the laser tube according to the present invention with an optical resonator comprising cylindrical reflecting mirrors.
Figure 2:
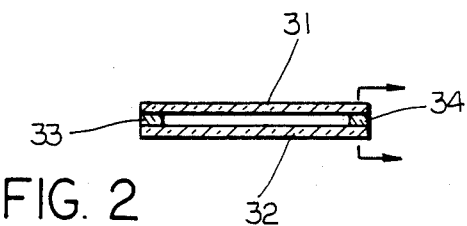
FIG. 2 is a cross sectional view taken along line A-A in FIG. 1.

With reference now to FIG. 1 the laser tube (20) according to the present invention has a straight discharge tube 14, a cathode portion 25 and an anode portion 29. The discharge tube 14 comprises Brewster windows 2 and 11, a cathode discharge hole 13 and an anode discharge hole 15. At least a part of the discharge tube has a substantially rectangular discharge cross section, as shown in FIG. 2. In a prefered embodiment of the present invention, the discharge tube has a substantially rectangular discharge cross section, and the width-height ratio of this discharge cross section is in the range of 4:1 to 8:1, for example, 3 mm×18 mm.

The discharge tube 14 can be made of soft glass plate and sticks by using a suitable process, such as frit sealing.

The cross section of the discharge tube may be maintained constant along the longitudinal direction of the discharge tube. In a prefered embodiment of the invention, however, the width to height or width of said cross section are varied along the longitudinal direction of the tube so as to make the activation volume determined by the discharge tube substantially the same with the mode volume determined by the optical resonator used with the laser tube, thus a further increase in the laser output power can be obtained. For example, a discharge tube with the desired cross section variation can be obtained by forming soft glass stick 33, 34 into suitable geometrical shape and then frit sealing them with soft glass plat 31 and 32.

The cathode portion 25 comprises a cathode 5, a cathode bulb 4 enclosing the cathode 5 and separating it from the outer environment, and cathode leads 3 and 6 through the cathode bulb 4 and electrically connected with the cathode 5. In a preferred embodiment of the invention, the cathode 5 is made in the form of filament-type oxide cathode which has the advantages of low cost, long lifetime and being able to supply high emission current required by the operation of the laser tube of the present invention.

The anode portion 29 comprises an anode 9, an anode bulb 8 enclosing the anode 9 and separating it from the outer environment, and anode leads 7 and 10 leading through the bulb 8 for electrically connecting the anode 9 with the exciting circuit. In a prefered embodiment of the invention, the anode 9 comprises a spirally wound titanium wire which can be used both as an anode and a titanium pump used to improve the vacuity within the discharge tube 14 when necessary.

The lead wires 3, 6, 7, and 10 may be made of three section conductor wires of nickel-dumet-twisting copper in order to be sealed with the bulb 4 and 8 of the soft glass.

The optical resonatar used with the laser tube of the present invention may comprise, for example, directly reflecting mirrors 1 and 12 which may be ordinary reflecting mirrors used for a laser. In a preferred embodiment of the invention, however, the optical resonator comprises at least one cylindrical mirror which is mounted in such a manner that its central axis extends along the width direction of the discharge tube of the present invention, whereby a better transverse mode can be obtained.

Figure 3:
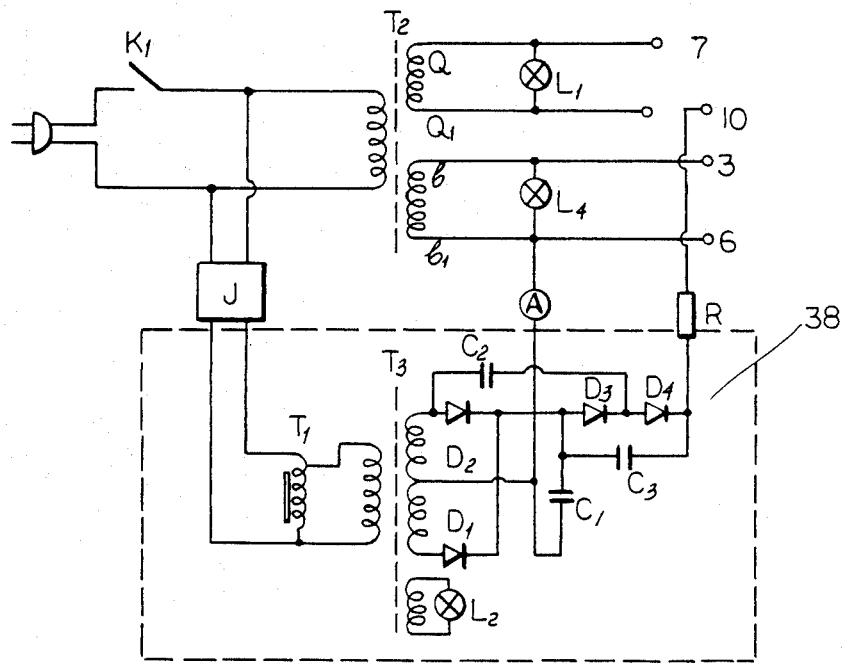
FIG. 3 illustrates the the laser system using the laser tube of the present invention.

FIG. 3 illustrates an embodiment of the exciting circuit of the laser using the laser tube of the present invention. In FIG. 3, the first windings of a transformer T1 and a filament transformer T2 are connected to a power supply, such as the commercial power supply. The secondary winding of the transformer T2 has two windings aa and bb. The winding bb is connected to the cathode filament 3 and 6 to heat the filament 5. The winding aa can be coupled to the anode leads 7 and 10 when necessary to heat the anode titanium pump so as to improve the vacuity within the discharge tube, while normally the winding aa is disconnected from leads 7, 10 for the purpose of increasing the lifetime of the titanium pump.

The output of transformer T1 is coupled to the first winding of a high-voltage transformer T3, and the output of the transformer T3 is rectified in a rectifier 38 to get a high voltage output which is in turn applied to the anode lead 10. In FIG. 3, L1 and L2 are indicating lamps while R is a current-limiting resistor.

By way of example, in an embodiment, the lase tube according to the present invention which uses He-Ne gases as working medium is about 1 mm long and has a discharge cross section of 3 mm×18 mm, and laser output of more than 60 mW can be obtained at the wavelength of 6328 A.

What is claimed is:

1. A longitudinally excited high power gas laser comprising:

means defining an optical axis along which the laser light propagates substantially back and forth in optical resonation;

a gas-tight discharge tube for containing an oxide cathode able to supply a high emission current and an anode which may also be used as a pump to improve vacuity within said discharge tube, each of said gaseous medium which defines a sole discharge passage between electrodes being enclosed respectively in glass bulbs connected by three section conductor wires with the discharge tube at opposite ends thereof by an excitation circuit which produces an for exciting discharge in said discharge tube, said discharge tube having a geometrical axis coaxial with the optical axis and a discharge cross section defined by the wall of the discharge tube, the cross section being substantially rectangular and having two orthogonal dimensions of width and height;

said substantially rectangular discharge cross section having a width to height ratio being greater than 4:1.

2. The gas laser of claim 1, wherein said gaseous medium is a mixture of helium and neon.

3. The gas laser of claim 1, and further comprising a direct current electrical supply to at least one of the electrodes.

4. The gas laser of claim 1, wherein the outside of the discharge tube is directly surrounded by atmosphere.

5. The gas laser of claim 1, wherein the width to height ratio is in a range of from 6:1 to 8:1.

6. A gas laser comprising:

a tube for enclosing a gaseous medium, the tube having an inside, an outside and longitudinally opposite ends, the inside of the tube having a substantially rectangular cross section transversely to the longitudinal direction between the opposite ends of the tube, the substantially rectangular cross section defining an orthogonal height and width having a ratio of the width to height greater than 4:1;

resonator means respectively at the longitudinally opposite ends of the tube for reflecting lasing radiation back and forth directly therebetween;

cathode and anode bulbs on the outside of the tube respectively at the opposite ends of the tube;

a cathode able to supply a high emission current and an anode which may also be used as a pump to improve vacuity within said discharge tube, being disposed respectively in the cathode and anode bulbs; and discharge holes respectively communicating the cathode and anode bulbs with the inside of the tube for only one laser-exciting discharge between the cathode and anode longitudinally through the tube.

* * * * *